United States Patent
Isberg

(10) Patent No.: US 12,273,689 B2
(45) Date of Patent: Apr. 8, 2025

(54) DOSIMETER FOR SOUND EXPOSURE

(71) Applicant: Sony Group Corporation, Tokyo (JP)

(72) Inventor: Peter Isberg, Lund (SE)

(73) Assignee: Sony Group Corporation, Tokyo (JP)

( * ) Notice: Subject to any disclaimer, the term of this patent is extended or adjusted under 35 U.S.C. 154(b) by 206 days.

(21) Appl. No.: 17/927,311

(22) PCT Filed: Jun. 9, 2021

(86) PCT No.: PCT/EP2021/065458
§ 371 (c)(1),
(2) Date: Nov. 22, 2022

(87) PCT Pub. No.: WO2021/250093
PCT Pub. Date: Dec. 16, 2021

(65) Prior Publication Data
US 2023/0199381 A1    Jun. 22, 2023

(30) Foreign Application Priority Data
Jun. 9, 2020   (SE) .................................. 2030193-3

(51) Int. Cl.
*H04R 3/00*     (2006.01)
*G08B 21/18*    (2006.01)
*H04R 29/00*    (2006.01)

(52) U.S. Cl.
CPC ............ *H04R 3/00* (2013.01); *G08B 21/182* (2013.01); *H04R 29/001* (2013.01)

(58) Field of Classification Search
CPC .. H04R 3/00; H04R 1/1091; H04R 29/00–01; G08B 21/182; G01H 3/14
See application file for complete search history.

(56) References Cited

U.S. PATENT DOCUMENTS

| | | | | |
|---|---|---|---|---|
| 6,826,515 | B2 * | 11/2004 | Bernardi | G01H 3/14 |
| | | | | 702/191 |
| 12,001,756 | B2 * | 6/2024 | Liu | G06F 3/165 |
| 2008/0181442 | A1 * | 7/2008 | Goldstein | H04R 1/1016 |
| | | | | 381/354 |
| 2008/0212787 | A1 | 9/2008 | Goldstein | |
| 2009/0092265 | A1 * | 4/2009 | Lovejoy | G10L 21/02 |
| | | | | 381/107 |

(Continued)

FOREIGN PATENT DOCUMENTS

EP    2333497 A1    6/2011

OTHER PUBLICATIONS

International Search Report and Written Opinion from corresponding International Application No. PCT/ EP2021/065458, mailed on Sep. 6, 2021, 12 pages.

(Continued)

*Primary Examiner* — Xu Mei
(74) *Attorney, Agent, or Firm* — Tucker Ellis LLP

(57) ABSTRACT

A method includes determining multiple sound-exposure doses (111) for multiple time intervals of a discretized and rolling sequence (100) of time intervals (101-109). The method also includes determining a cumulative sound-exposure dose based on a combination of the sound-exposure doses (111). The combination comprises a weighted contribution of the sound-exposure dose of at least one earliest time interval of the rolling sequence (100) of time intervals (101-109).

20 Claims, 7 Drawing Sheets

(56) References Cited

U.S. PATENT DOCUMENTS

| | | | |
|---|---|---|---|
| 2010/0135502 A1* | 6/2010 | Keady | A61B 5/121 |
| | | | 381/72 |
| 2010/0141439 A1 | 6/2010 | Lunner | |
| 2015/0110276 A1* | 4/2015 | Gereb | H04R 29/008 |
| | | | 381/56 |
| 2016/0066114 A1 | 3/2016 | Skovenborg | |
| 2017/0374444 A1* | 12/2017 | McNeill | H04R 1/1083 |
| 2018/0343529 A1* | 11/2018 | Lynch | H04R 3/00 |

OTHER PUBLICATIONS

Office Action and Search Report from corresponding Swedish Application No. 2030193-3, mailed on Feb. 8, 2021, 9 pages.

\* cited by examiner

DOSIMETER FOR SOUND EXPOSURE

TECHNICAL FIELD

Various examples generally relate to tracking sound exposure. Various examples specifically relate to determining a cumulative sound-exposure dose.

BACKGROUND

Exposure to sound can cause damages to the human ear. Accordingly, there have been efforts to track the sound-exposure dose so as to provide a warning when required.

For example, a dosimeter as specified in WHO/ITU-T H.870 determines a cumulative sound-exposure dose based on a combination of multiple sound-exposure doses over the past days. See Rec. ITU-T H.870 (08/2018), section II.7 "dosimeter implementation example". A warning is triggered if this cumulative sound-exposure dose exceeds a predefined threshold.

It has been found that such reference techniques of tracking the sound exposure can result in a high number of warnings and be subject to volatility. Inaccurate warnings have been observed.

SUMMARY

Accordingly, there is a need for advanced techniques of tracking exposure to sound. There is a need for techniques that alleviate or mitigate the above-identified drawbacks.

This need is met by the features of the independent claims. The features of the dependent claims define embodiments.

A method includes determining multiple sound-exposure doses. Each sound-exposure dose is determined for a respective time interval of multiple time intervals of a discretized and rolling sequence of time intervals. The method also includes determining a cumulative sound-exposure dose based on a combination of the multiple sound-exposure doses. The combination includes a weighted contribution of the sound-exposure dose of at least one earliest time interval of the sequence of time intervals.

A computer program or a computer-program product or a computer-readable storage medium includes program code. The program code can be executed by at least one processor. Upon executing the program code, the at least one processor performs a method. The method includes determining multiple sound-exposure doses. Each sound-exposure dose is determined for a respective time interval of multiple time intervals of a discretized and rolling sequence of time intervals. The method also includes determining a cumulative sound-exposure dose based on a combination of the multiple sound-exposure doses. The combination includes a weighted contribution of the sound-exposure dose of at least one earliest time interval of the sequence of time intervals.

The techniques described herein facilitate an accurate determination of the cumulative sound-exposure dose. In particular, quantization effects observed in reference implementations due to the consideration of multiple time intervals of the rolling sequence can be mitigated. In reference implementations, fluctuations of the cumulative sound-exposure dose are observed and unnecessary warnings can be triggered. Such problems are mitigated by using the weighted contribution of the sound-exposure dose of the at least one earliest time interval.

It is to be understood that the features mentioned above and those yet to be explained below may be used not only in the respective combinations indicated, but also in other combinations or in isolation without departing from the scope of the disclosure.

DETAILED DESCRIPTION OF EMBODIMENTS

Figure 1:
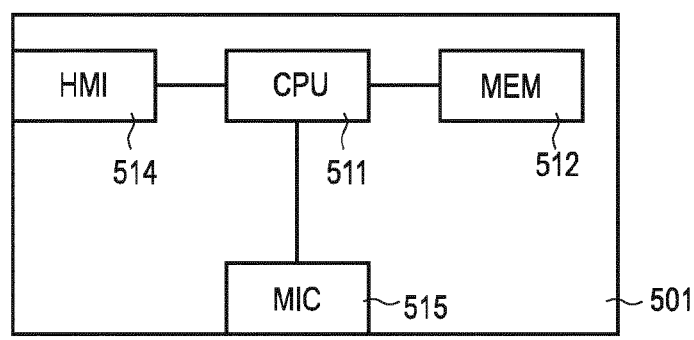
FIG. 1 schematically illustrates a device according to various examples configured to track sound exposure.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments will be described in detail with reference to the accompanying drawings. It is to be understood that the following description of embodiments is not to be taken in a limiting sense. The scope is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques that facilitate an audio dosimeter functionality are described. I.e., techniques are described that facilitate determining a sound-exposure dose. In particular, techniques are described that facilitate determining a cumulative sound-exposure dose (CSD) that takes into account the sound exposure observed in multiple time intervals. For instance, the sound-exposure doses of multiple time intervals can be combined, e.g., averaged or summed.

As a general rule, the sound-exposure dose of a given time interval can be determined by aggregating/integrating the acoustic power in that given time interval over the course of time t. This aggregation of acoustic power yields an acoustic energy. The acoustic energy correlates with the dose. This is described by Eq. (0) below:

$$\text{dose} = \int_{t1}^{t2} (p_A(t))^2 dt \tag{0}$$

where $p_A$ is the A-weighted and diffuse-field corrected sound pressure and the squared sound pressure correlates with the acoustic power. Eq. (0) implements the aggregation of the acoustic power by means of a time integration between points in time t1 and t2, to yield an acoustic energy associated with sound-exposure dose.

The sound pressure can also be determined based on the acoustic/sound level. Note that such A-weighting and diffuse-field corrections are generally optional; no or other pre-processing of the sound pressure or acoustic power would be conceivable.

As a general rule, the term acoustic power is used herein for the square of sound pressure at a given point in space (i.e., not integrated over all solid angles) and the term acoustic energy is used for the time-integrated acoustic power or more generally the (time-)aggregated acoustic power. Note that the acoustic energy itself can be aggregated over multiple sampling intervals, by adjusting the sound-exposure dose as time progresses: As time progresses, more and more acoustic energy accumulates; the sound-exposure dose increases.

For example, the CSD could be determined based on the sound-exposure doses of multiple days, e.g., the last 7 days, or for multiple hours, e.g., the last 24 hours. A respective discretized and rolling—i.e., progressively advancing—sequence of time intervals may be used, to track the up-to-date exposure to sound. To track or monitor the sound exposure, the cumulative sound exposure could be re-determined from time to time.

The techniques described herein facilitate determining the CSD based on a discretization of time domain into the time intervals. It has been found that such a discretization can adequately reflect the sound exposure and the associated risks to the human hearing system. For instance, depending on the typical usage cycle of a media-player device, the discretization could be in the order of days: in such a scenario it can be assumed that each day also has one or more such periods of rest, e.g., during night time/sleep. By considering the sound-exposure doses of multiple such time intervals, an averaged exposure can be considered that inherently takes into consideration stress and counteracting rest.

Various techniques are based on the finding that such discretization of the time domain into the time intervals can lead to quantization artifacts in the tracking of the sound exposure. In particular, it has been observed that when transitioning from a preceding time interval into a subsequent time interval, the CSD can be subject to irregularities such as sudden changes. Such irregularities have been found to originate from the discretization of time domain into the time intervals. Such irregularities are observed even if the granularity of the discretization is adjusted, e.g., from days to hours.

To mitigate such issues, it is possible to determine the CSD based on a combination of the sound-exposure doses of multiple time intervals of the discretized and rolling sequence of time intervals, wherein the combination includes a weighted contribution of the sound-exposure dose of at least one earliest time interval of the sequence of time intervals. The sequence of time intervals can be a rolling sequence: i.e., the earliest time interval at the beginning of the rolling sequence is removed/discarded from the sequence once adding a new current time interval at an end of the rolling sequence. This is sometimes also referred to as a sliding window technique.

The weighted contribution can correspond to a non-zero weighting factor which defines a different contribution of the at least one earliest time interval to the CSD if compared to one or more other time intervals.

For instance, consider a sequence of eight time intervals, then a non-weighted contribution would be implemented by the following weighting factors: {1;1;1;1;1;1;1;1}—here, each sound-exposure dose of the various time intervals is weighted with a factor of "1". A weighted contribution of the single earliest time interval could be implemented by: {0.5; 1;1;1;1;1;1;1}—here, the earliest time interval only contributes half as much to the CSD as the other time intervals; other weighting factors w are conceivable with 0<w<1. The weighting factor w thus damps the factor of the contribution associated with the sound-exposure dose of the respective time interval. By combining a rolling sequence with the weighted contribution of the at least one earliest time interval, a smoothed fade out of the contribution of the at least one earliest time-interval of the rolling sequence to the CSD is achieved. This helps to mitigate quantization effects in the CSD.

As a general rule, the weighting factor could be time invariant, i.e., not change as time progresses within a current time interval (dw/dt=0); or the weighting factor could be time dependent, i.e., change as time progresses within a current time interval (w=w(t)). For example, the weighting factor can change from 1 to 0 as time progresses from the beginning of the current time interval to the end of the current time interval. A weighting factor of 1 can correspond to the sound-exposure dose of the at least one earliest time interval corresponding in the same manner to the combination that provides the CSD as another time interval that is not weighted; a weighting factor smaller than 1 corresponds to damping the respective contribution to the CSD.

Note that the weighting factor additionally depends on the position of the respective time interval in the sequence of time intervals. This is expressed using the subscript k throughout this text: $w=w_k$. Here, $k=-N \ldots 0$, where N is the number of time intervals in the sequence, and 0 is the current time interval including now-time (i.e., the current point in time at which the determination of the CSD is made). As will be appreciated, the weighting factor is determined based on the position of the respective time interval in the rolling sequence, i.e., changes along with the progress in time domain.

Instead of considering the single earliest time interval, it would also be possible to use a weighted contribution of the two earliest time intervals, e.g., by $\{w_{-N}; w_{-N+1}; 1; 1; \ldots; 1\}$, where $0<w_{-N}<1$, and $0<w_{-N+1}<1$. As a general rule, different earliest time intervals can be damped differently, i.e., $w_{-N}\neq w_{-N+1}$. A gradual fade out would be possible, i.e., sound-exposure doses of earlier time intervals are damped stronger than sound-exposure doses of later time intervals: $w_{-N+x}<w_{-N+y}$, where $x<y$. This further facilitates the gradual fade-out of earlier time intervals, e.g., even without requiring a time-dependent weighting factor, by merely considering the weighting factor that depends on the position of the respective time interval in the sequence.

FIG. 1 schematically illustrates aspects with respect to a device 501 that can be used to implement audio dosimeter functionality according to the various examples described herein. The device 501 includes a processing circuitry 511, e.g., implemented by one or more processors, e.g., central processing units, etc. It would be possible to employ an application-specific integrated circuit or a field-programmable gate array. The device 501 also includes a nonvolatile memory 512 that can store program code. This program code can be loaded and executed by the processing circuitry 511. Upon executing the program code, the processing circuitry 511 can perform techniques as described herein, e.g., implement an audio dosimeter. For example, the processing circuitry 511 could determine sound-exposure doses for multiple time intervals, e.g., of a discretized and rolling sequence of time intervals. As a general rule, the sound-exposure doses described herein could be based on the estimated squared A-weighted and corrected sound pressure integrated over time (unit "Pa$^2$h"), see Eq. (0). The correction would normally be a "diffuse-field" correction, which is in this context a filter used to refer the measured quantity (e.g. in the music player or at the user's ear) into an equivalent external acoustic field, as would be the case e.g. when subjected to factory noise. This increases the compatibility with legacy risk assessment for occupational health. Other implementations of such correction are possible.

As illustrated in FIG. 1, the acoustic power can be determined based on a signal obtained from a microphone 515. Thereby, ambient or in-ear acoustic power can be measured and integrated over time to form estimates of acoustic energy (sound-exposure doses). Based on such sound-exposure doses, it would be possible to determine a CSD, e.g., by a combination of the sound-exposure doses determined for the multiple time intervals. In this regard, it is possible to buffer the sound-exposure doses for the time intervals until determining the CSD; the doses could be buffered in the memory 512.

It is also possible that the processing circuitry 511 outputs a warning to the user via a human-machine-interface 514 based on the CSD. As a general rule, it would be possible to output an acoustic warning or a graphical indication of the warning. For example, work labor standards in a noise-intensive work environment could be tracked.

For instance, in the various examples described herein, there may be a predefined threshold defined in units of the CSD and once the CSD crosses the predefined threshold from lower values to higher values, the warning can be triggered.

As a general rule, alternatively or additionally to triggering such a warning, it would also be possible that the acoustic power is adjusted. This can be the case where an acoustic source can be controlled by the device tracking the CSD. For instance, it would be possible that certain constraints are imposed on the acoustic power upon the CSD crossing the predefined threshold. For instance, a maximum value may be imposed on the acoustic power, e.g., by sending control data to a sound source. Thereby, operation of the sound source can be tailored to the sound exposure of the user. Continued user-machine interaction is facilitated.

Figure 2:
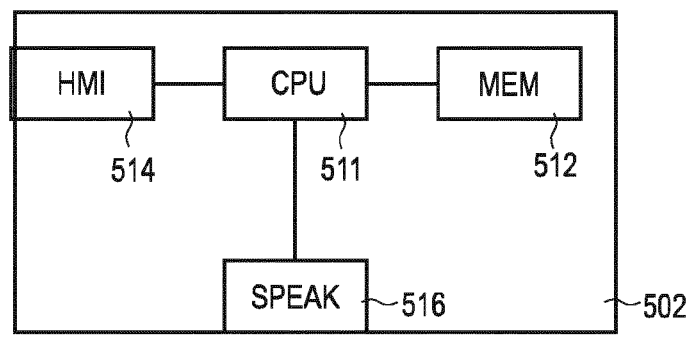
FIG. 2 schematically illustrates a device according to various examples configured to track sound exposure.

FIG. 2 schematically illustrates aspects with respect to a device 502 that can be used to implement audio dosimeter functionality according to the various examples described herein. The device 502 generally corresponds to the device 501 as discussed in connection with FIG. 1. In the scenario of FIG. 2, the device 502 includes a loudspeaker 516 that can be driven by the processing circuitry 511. To that end, the processing circuitry 511 can include a digital-to-analog converter. The processing circuitry 511 in the scenario of the device 502 can be configured to determine the acoustic power based on the driver signal provided to the speaker 516 and/or an underlying audio data.

Next, details with respect to audio dosimeter functionality that can be provided by the devices 501, 502 is described in connection with FIG. 3 and FIG. 4.

Figure 3:
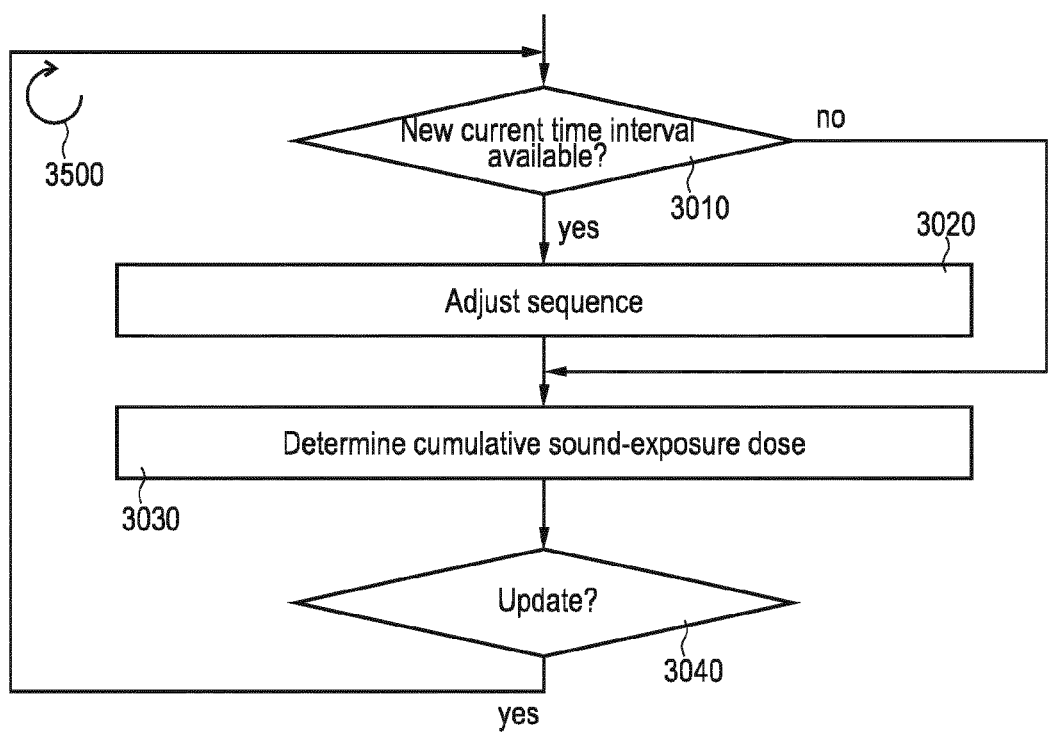
FIG. 3 is a flowchart of a method according to various examples.

FIG. 3 is a flowchart of a method of determining the CSD according to various examples. For instance, the method of FIG. 3 could be executed by one of the processing circuitries 511 of the devices 501, 502, e.g., upon loading program code from a respective memory 512. FIG. 3 specifically illustrates aspects with respect to determining the CSD based on sound-exposure doses of multiple time intervals of a rolling sequence. The method of FIG. 3 can be used to determine the CSD according to prior art techniques, but also according to techniques disclosed herein.

At box 3010, it is checked whether a new current time interval is available. Time domain is discretized into a sequence of time intervals. Once now-time crosses the boundary of a new time interval (the boundary is defined in accordance with the discretization), this new time interval is the current time interval.

Figure 4:
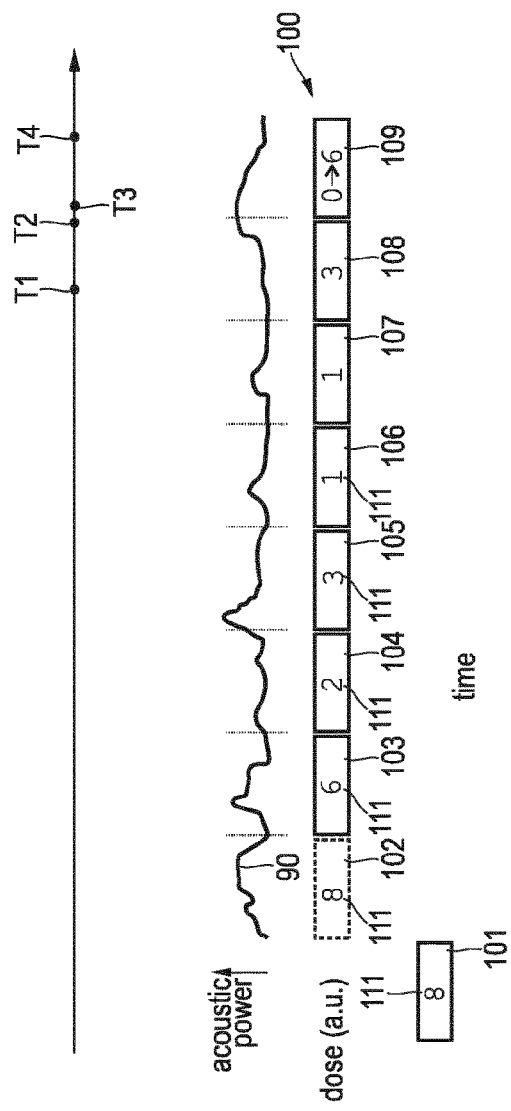
FIG. 4 schematically illustrates determining acoustic doses for multiple time intervals of a sequence of time intervals.

Such a sequence 100 is illustrated in FIG. 4. The acoustic power 90 is integrated over time, resulting in doses in time-discretized intervals 101-109. In the illustrated example, the time intervals 101-109 all have the same length; but, as a general rule, it would be possible that different time intervals 101-109 have different lengths (different lengths could be compensated for when determining the CSD by different weighting factors that normalize the length). For instance, each time interval 101-109 may correspond to a certain day, e.g., time interval 101 to Monday, time interval 102 to Tuesday, and so forth.

Continuing with the example using days of the week, wherein the CSD is measured over the course of a week, in the scenario of FIG. 4: N=6. I.e., the sequence 100 includes the current time interval and a count of six preceding time intervals, i.e., the sequence is a weekly rolling time window. For example: considering that the now-time is situated in the time interval 109 (e.g., Monday): in such a case, the sequence 100 includes the time intervals 103-109 (e.g., Tuesday to Monday). Differently, for a now-time situated in the time interval 108 (e.g., Sunday), the sequence 100 includes the time intervals 102-108 (e.g., Monday to Sunday).

The sound-exposure doses 111 of all time intervals 101-109 currently included in the rolling sequence 100 are held in a buffer memory. For example, the sound-exposure dose of the time interval 103 is "6" (arbitrary units), of the time interval 106 the sound-exposure dose is "1", for the illustrated example.

The sound-exposure dose of the current time interval including the now-time is repeatedly adjusted, by aggregating the acoustic energy over time (this will be explained later on in connection with FIG. 6). For this reason, the sound-exposure dose 111 is initially "0", when now-time just crosses the boundary into the time interval 109, i.e., at point in time T3; the sound-exposure dose 111 of the time interval 109 eventually increases to "6", towards the end of the time interval 109. This corresponds with the user's CSD for current time interval increasing over the length of that time interval.

Now referring again to FIG. 3: Once at box 3010 a new current time interval becomes available (as the now-time progresses), the rolling sequence 100 of time intervals is adjusted at box 3020.

In prior art implementations, the earliest time interval is discarded abruptly (i.e., there is no prior damping of the contribution of the respective sound-exposure dose to the CSD); while according to techniques described herein, the contribution of the sound-exposure dose of at least one earliest time interval to the CSD is first damped and only after such damping is the respective at least one earliest time interval discarded from the sequence. Thus, it can be said that the respective time interval is faded-out.

In any case, the sequence 100 is "rolling", i.e., progressing over the course of time. The associated sound-exposure dose of the then discarded time interval is not considered in the determining of the CSD, anymore. On the other hand, the sound-exposure dose of the new current time interval is considered in determining the CSD.

Differences of box 3020 between prior-art implementations and examples according to the techniques disclosed herein are summarized in TAB. 1 below:

TABLE 1

Differences in adjusting the sequence between prior art and examples of the techniques described herein

| Scenario | How to adjust sequence | Details |
| --- | --- | --- |
| A (prior art) | Earliest time interval discarded abruptly | There is no fading-out of the earliest time interval. Rather, the earliest time interval is discarded abruptly, when reaching the earliest position in the sequence. |
| B (example) | One or more earliest time intervals damped, e.g., progressively faded out | Prior to completely discarding a time interval of the sequence, the respective contribution of the sound-exposure dose of that time interval to the CSD is damped if compared to contributions of other time intervals of the sequence. |

According to some examples, it would be possible to prolongate the length of the sequence for scenario B of TAB. 1 if compared to scenario A of TAB. 1: for example, the sequence length of scenario A may be N* and the sequence length of scenario B may be N'=N*+t. where t>0. The parameter t could be labeled fade-out overhead. Then, the damping can be implemented for the t earliest positions in the sequence adjacent to the beginning of the sequence, before finally discarding the respective time intervals. It is not required in all scenarios to provide such fade-out overhead; rather, it would be possible to not adjust the sequence length between scenarios A and B of TAB. 1, and rather implement the fading-out within the same length of the sequence. Next, at box 3030, the CSD is determined. This is done based on the sound-exposure doses of the multiple time intervals of the sequence 100. In some examples, the CSD is determined based on a combination of the sound-exposure doses of the multiple time intervals currently included in the sequence 100.

At box 3040, it is checked whether an update of the CSD is required. For instance, an update could be triggered repeatedly, e.g., every few seconds or minutes or so. If yes, then box 3010, box 3020 (optionally), and box 3030 are re-executed. A corresponding iteration 3500 as illustrated in FIG. 3.

Figure 5:
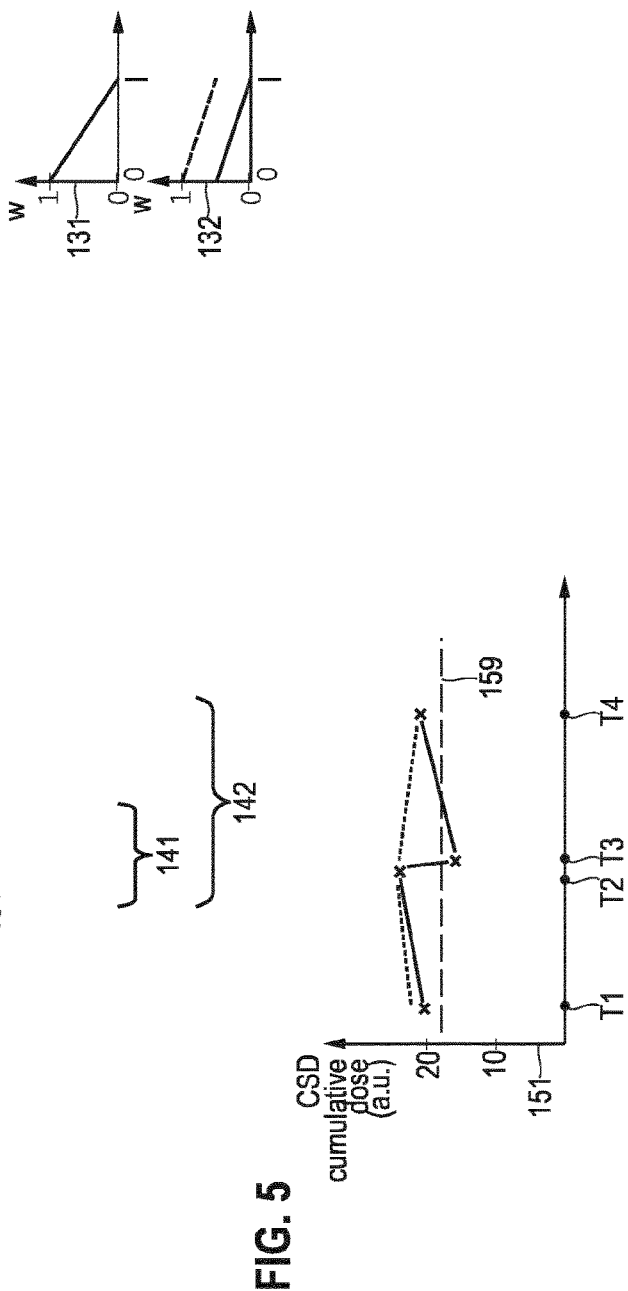
FIG. 5 schematically illustrates determining a cumulative sound-exposure dose based on a combination of sound-exposure doses of multiple time intervals, both according to reference techniques, as well as according to various examples.

Details with respect to the time-dependent behavior of the CSD 151 is illustrated in connection with FIG. 5. FIG. 5 is based on the scenario of FIG. 4: FIG. 5 illustrates the cumulative dose 151 determined for the sequence 100 of FIG. 4 at multiple points in time T1, T2, T3, and T4.

More specifically, FIG. 5 illustrates the CSD 151 determined using reference techniques using a solid line and further illustrates the cumulative dose 151 determined using techniques described herein using a dotted line.

It is assumed that for the reference techniques N=6 with an immediate removal of the earliest time interval, while for the example techniques N=7 with a gradual fade-out of the earliest time interval. Thus, considering a now-time in the time interval 109, the time interval 102 is discarded fully for the reference techniques, and included in the sequence but considered as a weighted contribution for the example techniques. For this reason, the time interval 102 is illustrated using dotted lines in FIG. 4.

According to the reference techniques, the CSD 151 is determined without applying a weighted contribution of the at least one earliest time interval; while according to the techniques described herein, the at least one earliest time interval of the sequence contributes in a weighted manner to the CSD 151.

First, the time-dependent behavior of the CSD 151 being determined using reference techniques is discussed:

At point in time T1, the current time interval is the time interval 108, i.e., the now-time at point in time T1 is included in the time-interval 108. The sequence 100 includes the time intervals 101-108 (N=6 for the reference techniques). The CSD 151 (determined using reference techniques) at point in time T1 is approximately "20" (arbitrary units, a.u.) which is the sum of the sound-exposure doses of each one of the time intervals 101-107, as well as the acoustic energy of the current time interval 108 up to T1.

More generally, the CSD 151 (determined using reference techniques) can be calculated as:

$$\text{CSD} = \text{dose}_{today} + \Sigma_{k=-N}^{-1} \text{dose}_k, \quad (1)$$

where k is an index counting a number of N previous time intervals and $\text{dose}_{today}$ is the dose of the current time interval, up to and including now-time. For example, in line with the above example, wherein the current time is time interval 108, at time T1, $\text{dose}_{today}$ is equal to the dose in time interval 108 up until now-time (T1).

As time progresses towards T2, the CSD 151 (determined using reference techniques) increases towards "24", as there is significant acoustic power 90 observed towards the point in time T2 during the time interval 108 (cf. FIG. 4). Note that from iteration 3500 to iteration 3500 in FIG. 3, as time progresses, the acoustic energy in the current time interval tends to increase (since more and more acoustic power is aggregated); accordingly, this effect tends to increase the CSD determined at box 3030.

Then, at point in time T3, the cumulative dose 151 (determined using reference techniques) suddenly drops to "16": this is due to the time interval 101 being removed from the sequence 100, as the new current time interval 109 commences. The sound-exposure dose 111 of the time interval 101 is "8": this contribution to the CSD 151 (determined using reference techniques) suddenly disappears upon removing the time interval 101. With time progressing into the time interval 109, the aggregated acoustic energy of the time interval 109 increases from "0" at the beginning of the time interval 109 to approximately "6" at the end of the time-interval 109 (cf. FIG. 6 below). Accordingly, the cumulative dose 151 (determined using reference techniques) increases again to the value of "22", by the end of time interval 109.

Now considering a scenario in which a warning is triggered each time the threshold 159 is crossed, here corresponding to a CSD of "19": in such a scenario, a warning would be triggered between points in time T3 and T4, even though the jumps in the cumulative dose 151 (determined using reference techniques) are not strongly related to the listening behavior of the user, but rather due to the quantization of the time domain into the time intervals 101-109.

For example, the threshold 159 could be defined as follows: a CSD below 1.6 Pa$^2$h per week is considered safe (this corresponds to <80 dBA for 40 hours). As a general rule, warnings could be triggered when the dose reaches 100% CSD, 200% CSD, or 300% CSD, etc. Note: With risk assessment according to the "equal energy principle", a sound level decrease of 3 dB means the exposure time can be doubled, for the same risk. A sound level decrease of 10 dB (perceived as ~half as loud) means the exposure time can be 10x, for the same risk.

Such a reference implementation as discussed in connection with FIG. 5 mimics a dosimeter implementation according to WHO-ITU Safe Listening Devices and Systems/ITU-T H.870 (2018) which utilizes seven memories, one for each day of the week. The weekly dose=dose as it grows during the current day+the cumulated dose for the 6 preceding days (N=6). When midnight is passed, the dose saved for the oldest day is reset to zero. The reset causes an issue with unexpected results for the user and can trigger unnecessary warnings.

This problem is mitigated by using a fade-out of the sound-exposure dose of at least one earliest time interval of the sequence 100 to be discarded, rather than an abrupt removal from the sequence. The combination of Eq. (1) is modified as follows:

$$\text{CSD} = \text{dose}_{today} + \Sigma_{k=-N+1}^{-1} \text{dose}_k + w_{-N} \cdot \text{dose}_{-N}, \quad (2)$$

where $0 < w_{-N} < 1$ is the weighting factor defining a weighting contribution of the sound-exposure dose of the earliest time interval to the CSD (the doses for −N+1 to −1 could be said to be weighted with "1" or simply non-weighted). Further, to provide for the fade-out, N=6→N=6+1=7. Here, a fade-out overhead of t=1 is considered. This is optional, and in other configurations it would be possible to keep N=6 and rather damp the contribution of the sound-exposure dose of the earliest time interval within the sequence of length N=6. As will be appreciated, this weighted contribution defined by the weighting factor relatively damps the factor of the sound-exposure dose of the earliest time interval in the sequence. This corresponds to a fading-out the earliest time interval.

In some examples, it would be possible that $w_{-N}$ is fixed, e.g., to 0.5 or another factor. I.e., there is no time dependency. This may help to reduce a size of quantization drops observed in the CSD.

In other examples, $w_{-N}$ may be time dependent, $w_{-N}(t)$. For instance, the damping could increase with progression into the current time interval, e.g., linearly as described by:

$$w_{-N}(t) = t/l, \quad (3)$$

where t denotes the time into the current time interval, i.e., t=0 for the now-time at the beginning of the current time interval and t=l for the now-time at the end of the current time interval, l being the length of the current time interval. This corresponds to progressively fading-out the earliest time interval; quantization drops can be avoided.

Then, for a 24 hour time interval aligned with days (i.e. midnight to midnight), at noon $w_{-N(noon)}=0.5$ (note: 12/24 hours, 720/1440 minutes=0.5). Such a behavior is illustrated for the weighting factor 131 in FIG. 4.

Thereby, it is possible to smooth or, more specifically, low-pass filter the time evolution of the CSD 151. Using Eq. (2) and (3), a behavior as indicated by the dotted line in FIG. 5 can be obtained. Here, the threshold 159 is not crossed and, accordingly, a warning is not triggered.

The shape of the CSD 151 according to the dotted line can be qualitatively motivated as follows: (i) there is a first contribution to the CSD 151 which decreases over time, namely the contribution of the sound-exposure dose of the earliest time interval 102 which is progressively damped according to Eqs. (2) and (3); (ii) there is a second contribution to the CSD 151 which tends to increase over time—hence, counteracting contribution (i): this is the increase in the accumulated acoustic energy in the current time interval 109. The superposition of contributions (i) and (ii) results in the illustrated behavior of the CSD 151.

Instead of such a linear time-dependency of the weighting defining the weighted contribution, the weighted contribution could generally depend on any predefined time-dependent filter function. For example, an exponential decay would be conceivable.

Further, in the example of Eq. (2) and Eq. (3) the sound-exposure dose of the current time interval is progressively adjusted along with a progression of time into the current time interval and along with such progressively adjusting, the weighted contribution depends on a relation between this progression into the current time interval and a length of the current time interval. It would also be possible that the weighted contribution depends on a relation between this progression into the current time interval and the length of the at least one earliest time interval to be discarded that is respectively weighted.

Eq. (2) can be rewritten to a more general form:

$$\text{CSD} = \text{dose}_{today} + \Sigma_{k=-N}^{-1} w_k \cdot \text{dose}_k. \quad (4)$$

$w_k$ defines a windowing function. By the weighted contribution of the at least one earliest time interval (i.e., $w_{-N} \neq w_0 = 1$), the windowing function is asymmetric (while, in reference implementations as discussed above in connection with Eq. (1), it is rectangular and thus symmetric). This is helpful, because there is value in a "quick meter response" for the current day, in order to give feedback to the user about the current listening, while there is value in a "slow meter response" when it comes to gradually discarding the dose recorded during the preceding 6-7 days.

As a general rule, it is possible that the combination to determine the CSD considers a weighted contribution for only the single earliest time interval at the beginning of the sequence 100, or for multiple earliest time intervals. Thus, Eq. (2) can be re-written to $$CSD = dose_{today} + \Sigma_{k=-N+M}^{-1} dose_k + \Sigma_{k=-N}^{-N+M-1} w_k(t) \cdot dose_k \quad (5)$$

with 1<M<N.

For instance, as illustrated in FIG. 4, there can be a subset 141 only including—e.g., for the now-time at T3 or T4—the single earliest time interval 102 of the sequence 100, i.e., M=1; or there can be a subset 142 including the two earliest time intervals 102, 103 of the sequence 100 (M=2). For the latter case of the weighted contribution of multiple earliest time intervals 102, 103, an example weighting factor w 132 as illustrated in FIG. 4, wherein the dotted line illustrates the time dependency of this weighting factor of 132 for the sound-exposure dose 111 of the time interval 103 throughout the time progressing into the current time interval 109, while the full line illustrates a time dependency of this weighting factor 132 for the sound have an exposure dose 111 of the time interval 102. As illustrated, the relative contribution of the sound-exposure dose 111 of the time interval 102 to the CSD 151 is smaller than the relative contribution of the sound-exposure dose 111 of the time interval 103, thereby again defining an asymmetry in the respective windowing function. As a general rule, the contribution of the sound-exposure doses associated with different earliest time intervals to the CSD can be damped differently. A gradual fade out would be possible, i.e., sound-exposure doses of earlier time intervals are damped stronger than sound-exposure doses of later time intervals: $w_{-N+x} < w_{-N+y}$ where x<y.

It may be beneficial to even further smooth the fade-out of the contribution of the sound-exposure dose of multiple earliest time intervals of the sequence to the CSD. Above, scenarios have been described in which the fade-out is performed by applying the weights to the sound-exposure doses of the individual time intervals, cf. Eq. (2) weight $w_k$, and weighting factor 132 in FIG. 4. In further examples, it would be possible that the weighted contribution of multiple earliest time intervals of the sequence 100 is based on an average of these multiple earliest time intervals. By first averaging sound-exposure doses from several time intervals, e.g., days, their contributions to the CSD can be evenly distributed the several time intervals and a fade-out is applied on the CSD:

$$CSD = dose_{today} + \Sigma_{k=-N+M}^{-1} dose_t + w(t) \cdot m, \quad (6)$$

where m is sum from several time intervals or the mean from several time intervals, e.g., $$m = \frac{1}{M} \sum_{k=-N}^{-N+M-1} dose_k. \quad (7)$$

m can be otherwise based on a combination of the sound-exposure doses of the respective time intervals.

Figure 6:
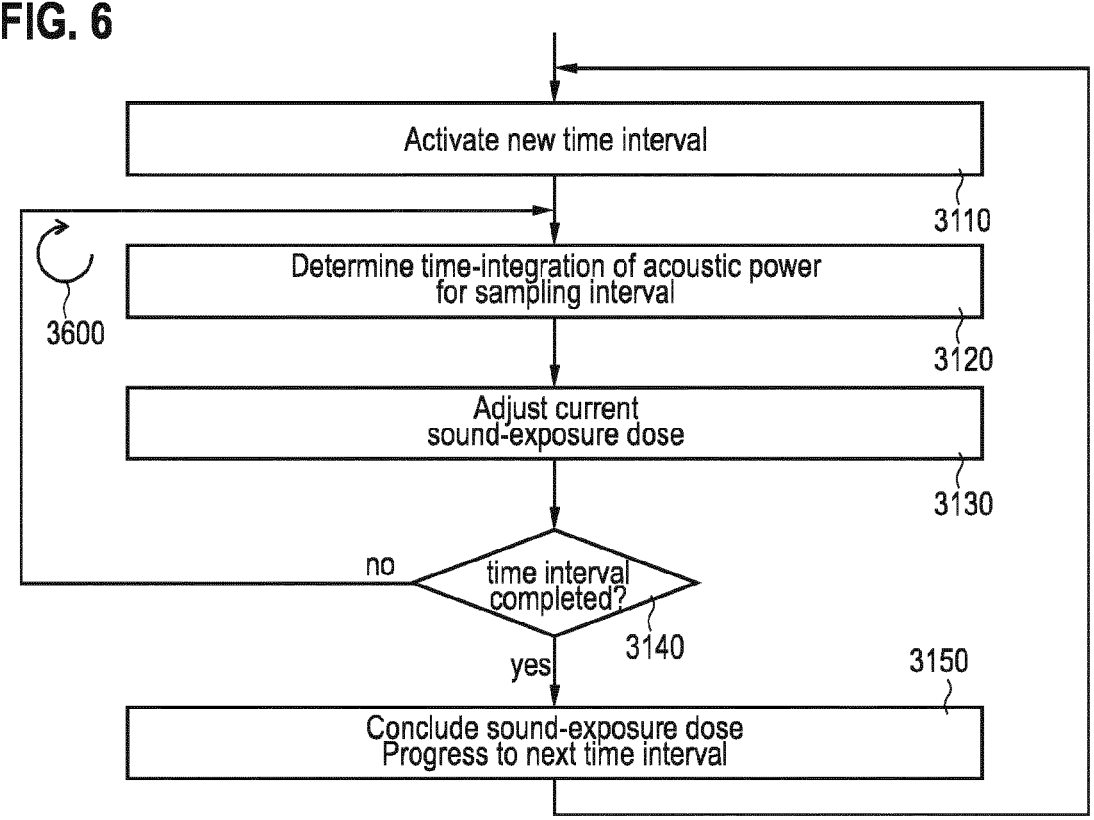
FIG. 6 is a flowchart of a method according to various examples.

FIG. 6 is a flowchart of a method according to various examples. FIG. 6 schematically illustrates adjusting the sound exposure dose of a current time interval 101-109. For example, the method of FIG. 6 could be executed by the processing circuitries 511 of the devices 501, 502 (cf. FIG. 1 and FIG. 2).

FIG. 6 schematically illustrates aspects with respect to progressively adjusting the sound-exposure dose of the current time interval as time progresses into the current time interval. By using the method of FIG. 6, the gradual increase of the sound-exposure dose as illustrated for the time interval 109 in FIG. 4 can be obtained.

At box 3110, a new time interval is activated, e.g., when crossing a time boundary between subsequent time intervals. Box 3110 can be aligned with box 3010 of FIG. 3.

At box 3120, the acoustic energy for a sampling interval is determined. The sampling interval can be much shorter than the length of the time interval. For example, the length of the sampling interval can be in the order of seconds or minutes; while the length of the time interval can be in the order of hours or days. For example, it would be possible that the duration of the sampling intervals is shorter than the length of one or more of the time intervals 101-109 at least by a factor of 1000.

The acoustic energy could be determined using a filter function applied to the acoustic power, e.g., to consider the digital-to-analog conversion of a loudspeaker driver, headphone influence, diffuse-field or free-field correction, and/or A-weighting. See Eq. (0).

Then, at box 3130, the current sound-exposure dose is adjusted, e.g., by adding the acoustic energy determined for the current sampling interval to the previously determined sound-exposure dose (the sound-exposure dose for the time interval can be initialized at 0 and then progressively be increased with progress into the time interval). This corresponds to accumulating acoustic energy to determine the sound-exposure dose.

At box 3140, it is checked whether the current time interval is completed. If not, then in a further iteration 3600, the acoustic energy is determined for next sampling interval, by re-executing box 3120 and, subsequently, the sound-exposure dose of the current time intervals again adjusted. For instance, the iterations 3600 could be time-aligned with the iterations 3500 (cf. FIG. 3).

On the other hand, if at box 3140 it is judged that the time interval is completed, the method commences at box 3150, in which the sound-exposure dose of the current time interval is concluded, e.g., written to a buffer memory; then, the method commences by activating a further new time interval at box 3110.

Summarizing, techniques have been described which help to more accurately trigger warnings based on tracking sound exposure. Thereby, a user can be influenced towards more healthy listening habits. The user should be mindful of volume control and listening time. The user should become educated in what constitutes healthy habits. Relevant warnings can be issued. By avoiding irrelevant warnings, the severity of any particular warning is emphasized.

Further, inaccuracies in the determined CSD can be mitigated, because quantization effects artificially introducing drops or charms in the CSD can be avoided. Thereby, misinformation to a user can be avoided.

When determining a CSD based on the sound-exposure doses of multiple time intervals (e.g., 7-days), old sound-exposure doses are gradually faded out to avoid unnecessary fluctuations of the CSD which might, in turn, trigger unnecessary user warnings.

Figure 7:
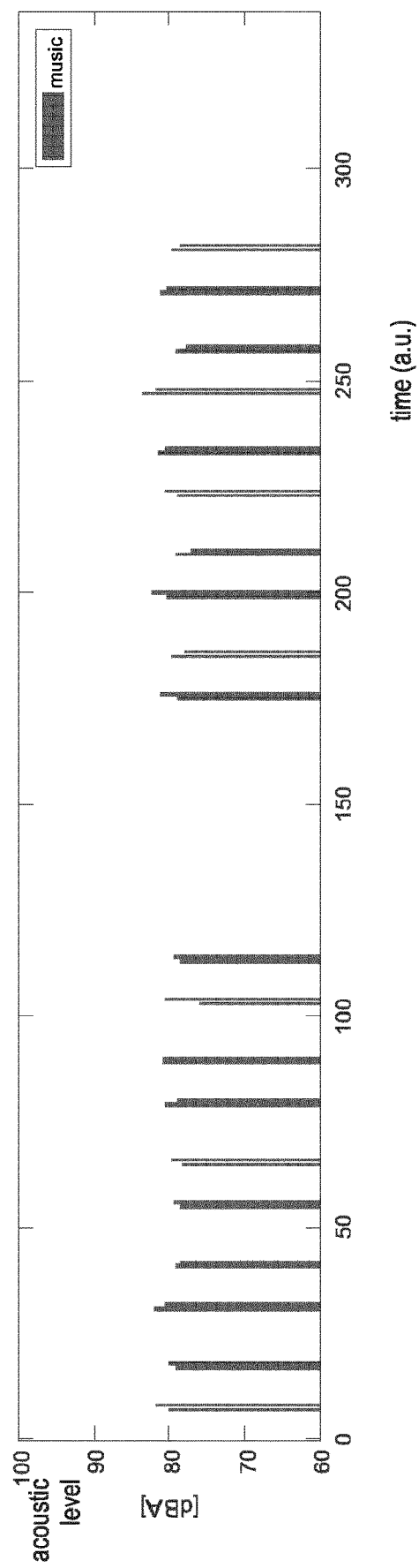
FIG. 7 schematically illustrates a time-dependency of an acoustic level of a simulation that illustrates effects of various examples described herein.

To illustrate these effects, simulations were performed. FIG. 7 illustrates the acoustic level over time, for two weeks. In this example, the music level over time was modeled as a Gaussian random variable. The standard deviation was at first set rather low at 2 dB to illustrate the situation of consistent listening habits. The listening hours habit was selected as for a work commuter who is listening on weekdays only with 2 h in the morning and 2 h in the evening.

Figure 8:
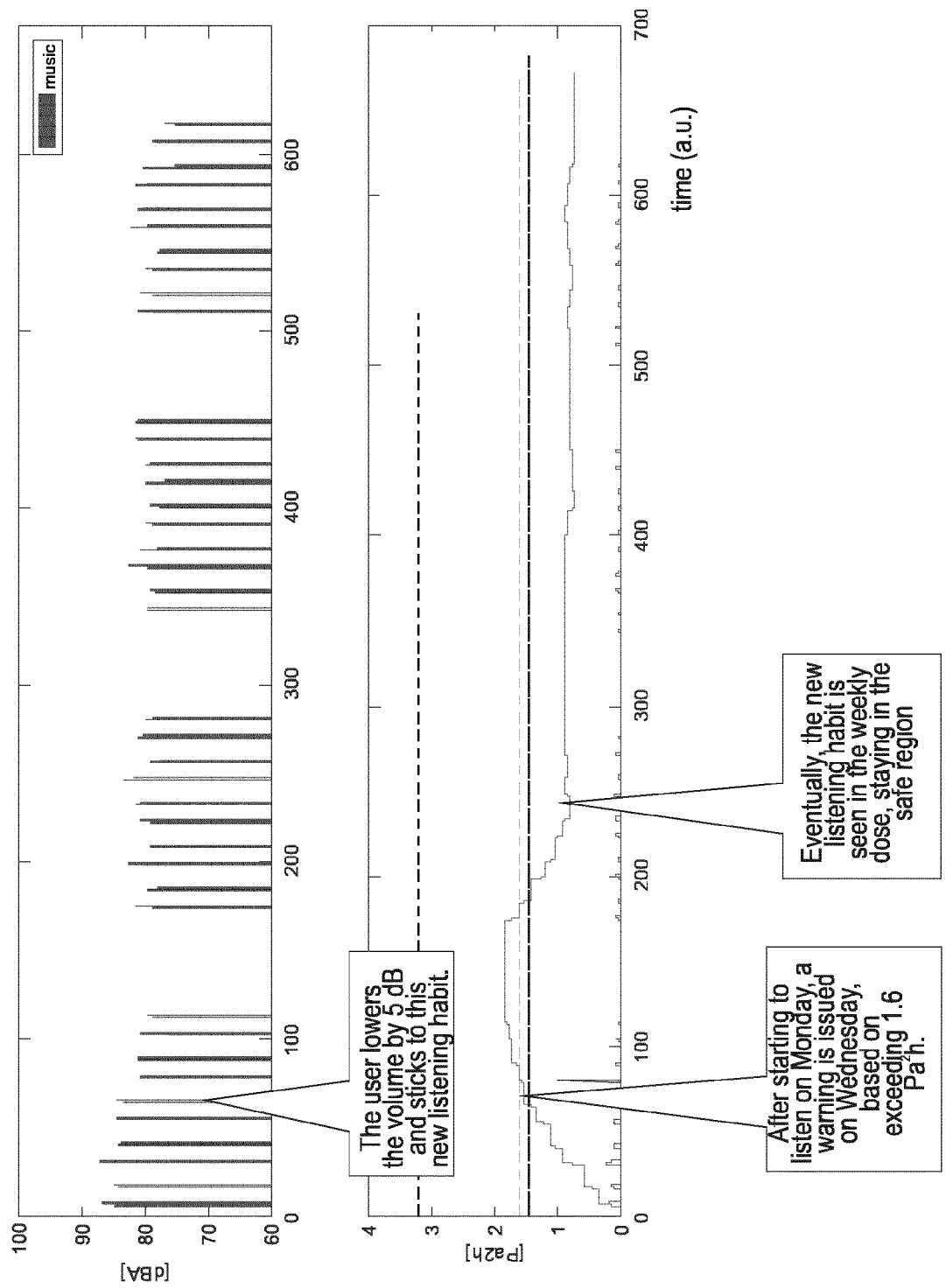
FIG. 8 also schematically illustrates the time-dependency of the acoustic level and weekly dose of the simulation, considering an adjustment in the user behavior in response to a warning triggered based on a cumulative sound-exposure dose.

The basic idea is that users should stay below the weekly reference dose of 100% CSD (1.6 $Pa^2h$). If the user hits 100% CSD, a warning is issued and the idea is that users should now lower the volume control, and stay below 100%. This is illustrated in FIG. 8.

Figure 9:
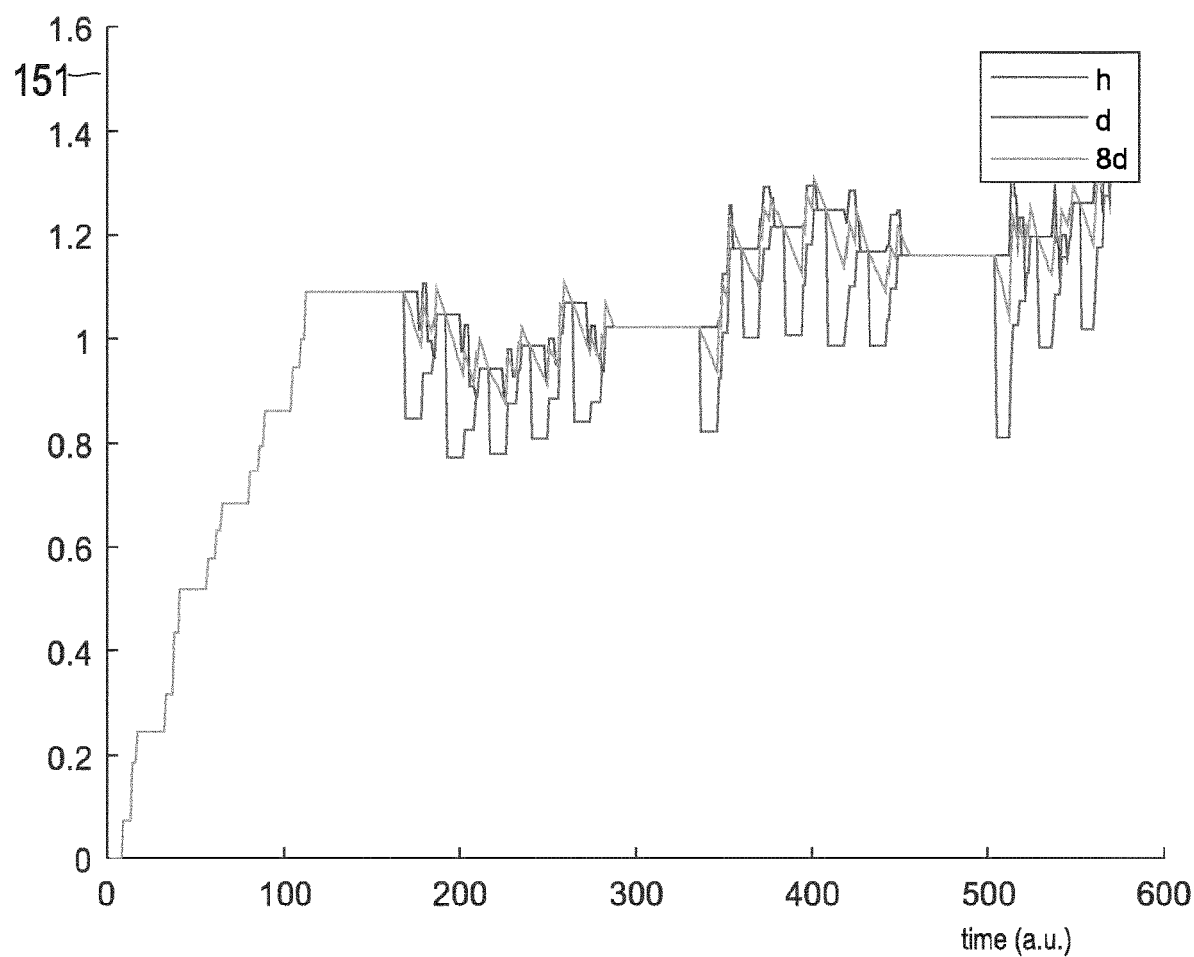
FIG. 9 schematically illustrates quantization effects in the cumulative sound-exposure dose determined according to reference implementations

But the user can also acknowledge the warning and continue without reducing the volume, accepting the risk, what happens then? According to the implementation example in H.870 appendix, the dose estimator according to reference implementations may use seven memories, one for each weekday. This can create quantization effects. E.g., when passing midnight between say Tuesday and Wednesday, the old Tuesday memory should be erased and the current day should increase from zero. This creates sudden jumps in weekly dose, which can increase the number of warnings. Such quantization effects are illustrated in FIG. 9, here for lengths of the time intervals corresponding to one hour and one day. Weekly dose estimates using a method from the present description is also included ("8 d"). As for "d", it uses time intervals corresponding to one day, but the amount of memories is 8 instead of 7 and a fade is applied to the oldest day. As will be appreciated, for all lengths, the quantization effects are visible, albeit less pronounced for shorter lengths. By using a gradual fade-out, quantization effects can be mitigated.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various techniques have been described in the context of sound exposure and associated sound-exposure doses. As a general rule, similar techniques may be readily applied to tracking exposure to other environmental quantities, e.g., radiation, ultraviolet light, etc.

The invention claimed is:

1. A method of tracking sound exposure, comprising:
   determining multiple sound-exposure doses for multiple time intervals of a discretized and rolling sequence of time intervals; and
   determining, based on a combination of the sound-exposure doses, a cumulative sound-exposure dose,
   wherein the combination of the sound-exposure doses comprises a weighted contribution of the sound-exposure dose of at least one earliest time interval of the rolling sequence of time intervals, wherein the weighted contribution is defined by a weighting factor w which is a non-zero weighting factor.

2. The method of claim 1, wherein the weighting factor w is less than 1 with 0<w<1, the method comprising:
   damping, according to the weighted contribution defined by the weighting factor w, a factor of the combination associated with the sound-exposure dose of the at least one earliest time interval.

3. The method of claim 2, wherein the weighting factor w is time dependent such that the weighting factor w changes as time progresses within a current time interval, the method comprising:
   damping, according to the weighted contribution defined by the time-dependent weighting factor w, the factor of the combination associated with the sound-exposure dose of the at least one earliest time interval, wherein the damping increases with a progression into the current time interval of the rolling sequence of time intervals.

4. The method of claim 1, further comprising:
   progressively adjusting the sound-exposure dose of a current time interval of the rolling sequence of time intervals along with a progression into the current time interval,
   wherein the weighted contribution depends on a relation between (i) the progression into the current time interval and a length of the current time interval, or (ii) the progression into the current time interval and a length of the at least one earliest time interval.

5. The method of claim 4, comprising:
   progressively adjusting the sound-exposure dose of the current time interval in accordance with sampling intervals during which acoustic energy is measured, wherein a duration of the sampling intervals is shorter than the length of the at least one earliest time interval.

6. The method of claim 5, wherein the progressively adjusting comprises progressively adjusting the sound-exposure dose of the current time interval in accordance with the sampling intervals during which acoustic energy is measured, wherein the duration of the sampling intervals is shorter than the length of one or more of the multiple time intervals at least by a factor of 1000.

7. The method of claim 1, wherein the at least one earliest time interval includes a single time interval at a beginning of the rolling sequence of time intervals.

8. The method of claim 1, wherein the at least one earliest time interval includes multiple earliest time intervals at a beginning of the rolling sequence of time intervals, the method comprising:
   differently damping, according to the weighted contribution defined by the weighting factor w, factors of the combination associated with the sound-exposure doses of the multiple earliest time intervals forming the at least one earliest time interval.

9. The method of claim 1, wherein the at least one earliest time interval includes multiple earliest time intervals at a beginning of the rolling sequence of time intervals, wherein the weighted contribution is based on an average of the multiple earliest time intervals forming the at least one earliest time interval, the method comprising:
   averaging sound-exposure doses from the multiple earliest time intervals forming the at least one earliest time interval such that their weighted contributions to the cumulative sound-exposure dose is evenly distributed across the multiple earliest time intervals.

10. The method of claim 1, wherein the determining comprises determining the cumulative sound-exposure dose based on the combination of the sound-exposure doses determined for multiple time intervals, wherein the combination of sound-exposure doses comprises the weighted contribution, the weighted contribution depending on a predefined time-dependent filter function.

11. The method of claim 1, further comprising:
   in response to the cumulative sound-exposure dose crossing a predefined threshold, selectively triggering a warning.

12. A device configured to track sound exposure, the device comprising:
   a control circuitry comprising:
      at least one processor; and
      a non-transient memory device operatively coupled with the at least one processor, the non-transient memory device storing a computer program comprising executable program code that, when executed on the at least one processor of the control circuitry or loaded onto the at least one processor of the control circuitry, causes the control circuitry to automatically track sound exposure,
wherein the control circuitry is configured to:
determine multiple sound-exposure doses for multiple time intervals of a discretized and rolling sequence of time intervals; and
determine, based on a combination of the sound-exposure doses, a cumulative sound-exposure dose,
wherein the combination of the sound-exposure doses comprises a weighted contribution of the sound-exposure dose of at least one earliest time interval of the rolling sequence of time intervals, wherein the weighted contribution is defined by a weighting factor w which is a non-zero weighting factor.

13. The device according to claim 12, wherein the weighting factor w is less than 1 with $0<w<1$, wherein the control circuitry is further configured to:
damp, according to the weighted contribution defined by the weighting factor w, a factor of the combination associated with the sound-exposure dose of the at least one earliest time interval.

14. The device according to claim 13, wherein the weighting factor w is time dependent such that the weighting factor w changes as time progresses within a current time interval, wherein the control circuitry is further configured to:
damp, according to the weighted contribution defined by the time-dependent weighting factor w, the factor of the combination associated with the sound-exposure dose of the at least one earliest time interval, wherein the damping increases with a progression into the current time interval of the rolling sequence of time intervals.

15. The device according to claim 12, wherein the control circuitry is further configured to:
progressively adjust the sound-exposure dose of a current time interval of the rolling sequence of time intervals along with a progression into the current time interval, wherein the weighted contribution depends on a relation between (i) the progression into the current time interval and a length of the current time interval, or (ii) the progression into the current time interval and a length of the at least one earliest time interval.

16. The device according to claim 15, wherein the control circuitry is further configured to:
progressively adjust the sound-exposure dose of the current time interval in accordance with sampling intervals during which acoustic energy is measured, wherein a duration of the sampling intervals is shorter than the length of the at least one earliest time interval.

17. The device according to claim 12, wherein the at least one earliest time interval includes multiple earliest time intervals at a beginning of the rolling sequence of time intervals, wherein the control circuitry is further configured to:
differently damp, according to the weighted contribution defined by the weighting factor w, factors of the combination associated with the sound-exposure doses of the multiple earliest time intervals forming the at least one earliest time interval.

18. The device according to claim 12, wherein the at least one earliest time interval includes multiple earliest time intervals at a beginning of the rolling sequence of time intervals, wherein the weighted contribution is based on an average of the multiple earliest time intervals forming the at least one earliest time interval, wherein the control circuitry is further configured to:
average sound-exposure doses from the multiple earliest time intervals forming the at least one earliest time interval such that their weighted contributions to the cumulative sound-exposure dose is evenly distributed across the multiple earliest time intervals.

19. The device according to claim 12, wherein the control circuitry is further configured to:
selectively output a warning to a user, in response to the cumulative sound-exposure dose crossing a predefined threshold, via a human-machine-interface.

20. A non-transitory computer readable storage medium storing a computer program comprising program code that, when executed on at least one processor of a computer or loaded onto the at least one processor of the computer, causes the computer to perform a method of tracking sound exposure, by:
determining multiple sound-exposure doses for multiple time intervals of a discretized and rolling sequence of time intervals; and
determining, based on a combination of the sound-exposure doses, a cumulative sound-exposure dose,
wherein the combination of the sound-exposure doses comprises a weighted contribution of the sound-exposure dose of at least one earliest time interval of the rolling sequence of time intervals, wherein the weighted contribution is defined by a weighting factor w which is a non-zero weighting factor.

* * * * *